(12) United States Patent
Sokhey et al.

(10) Patent No.: US 9,714,608 B2
(45) Date of Patent: Jul. 25, 2017

(54) REDUCED NOISE GAS TURBINE ENGINE SYSTEM AND SUPERSONIC EXHAUST NOZZLE SYSTEM USING ELECTOR TO ENTRAIN AMBIENT AIR

(75) Inventors: Jagdish S. Sokhey, Indianapolis, IN (US); Anthony F. Pierluissi, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 75 days.

(21) Appl. No.: 14/343,155

(22) PCT Filed: Sep. 5, 2012

(86) PCT No.: PCT/US2012/053777
§ 371 (c)(1),
(2), (4) Date: May 16, 2014

(87) PCT Pub. No.: WO2013/077924
PCT Pub. Date: May 30, 2013

(65) Prior Publication Data
US 2014/0238043 A1    Aug. 28, 2014

Related U.S. Application Data

(60) Provisional application No. 61/532,298, filed on Sep. 8, 2011.

(51) Int. Cl.
*F02K 1/36*    (2006.01)
*F02C 3/04*    (2006.01)
(Continued)

(52) U.S. Cl.
CPC ............. *F02C 3/04* (2013.01); *F02K 1/36* (2013.01); *F02K 1/383* (2013.01); *F02K 1/386* (2013.01); *F02K 3/025* (2013.01); *F02K 3/077* (2013.01)

(58) Field of Classification Search
CPC ..... F02K 1/06; F02K 1/12; F02K 1/28; F02K 1/32; F02K 1/36; F02K 1/48; F02K 1/70;
(Continued)

(56) References Cited

U.S. PATENT DOCUMENTS 3,749,316 A * 7/1973 Tontini ................. F02K 1/36
                                                    181/215
4,135,363 A * 1/1979 Packman ............. F02K 1/386
                                                    181/213
(Continued)

OTHER PUBLICATIONS

PCT International Search Report completed by the ISA/US on Apr. 30, 2013 and issued in connection with PCT/US2012/053777.

*Primary Examiner* — Pascal M Bui Pho
*Assistant Examiner* — Marc Amar
(74) *Attorney, Agent, or Firm* — Barnes & Thornburg LLP

(57) ABSTRACT

One embodiment of the present invention is a unique gas turbine engine system. Another embodiment is a unique exhaust nozzle system for a gas turbine engine. Other embodiments include apparatuses, systems, devices, hardware, methods, and combinations for gas turbine engine systems and exhaust nozzle systems for gas turbine engines. Further embodiments, forms, features, aspects, benefits, and advantages of the present application will become apparent from the description and figures provided herewith.

17 Claims, 2 Drawing Sheets

(51) Int. Cl.
*F02K 1/38* (2006.01)
*F02K 3/02* (2006.01)
*F02K 3/077* (2006.01)

(58) Field of Classification Search
CPC . F02K 1/72; F02K 3/025; F02K 3/077; F02K 1/38; F02K 1/383; F02K 1/386
See application file for complete search history.

(56) References Cited

U.S. PATENT DOCUMENTS

| | | | | |
|---|---|---|---|---|
| 5,154,052 | A | * | 10/1992 | Giffin, III ............... F02K 1/006 239/265.13 |
| 5,404,713 | A | * | 4/1995 | Johnson ................. F02K 1/825 60/204 |
| 2005/0047942 | A1 | * | 3/2005 | Grffin, III ............... F02K 3/072 417/423.1 |
| 2005/0109012 | A1 | * | 5/2005 | Johnson ................. F02K 3/065 60/226.1 |
| 2007/0000232 | A1 | * | 1/2007 | Powell .................... F02C 3/13 60/204 |
| 2010/0154423 | A1 | * | 6/2010 | Olausson ............... F02K 1/383 60/725 |
| 2010/0162679 | A1 | * | 7/2010 | Khalid .................... B64C 7/02 60/204 |
| 2010/0162680 | A1 | | 7/2010 | Khalid |

* cited by examiner

REDUCED NOISE GAS TURBINE ENGINE SYSTEM AND SUPERSONIC EXHAUST NOZZLE SYSTEM USING ELECTOR TO ENTRAIN AMBIENT AIR

CROSS REFERENCE TO RELATED APPLICATIONS

This application is a U.S. national counterpart application of international application serial No. PCT/US2012/053777 filed Sep. 5, 2012, which claims priority under 35 USC §119(e) to U.S. Provisional Patent Application No. 61/532,298 filed Sep. 8, 2011, the entire disclosures of which are incorporated herein by reference.

GOVERNMENT RIGHTS

The present application was made with the United States government support under Contract No. NNC10CA02C, awarded by NASA. The United States government may have certain rights in the present application.

FIELD OF THE INVENTION

The present invention relates to gas turbine engines, and more particularly, to gas turbine engine systems and supersonic nozzles for gas turbine engine systems.

BACKGROUND

Gas turbine engine systems and exhaust nozzle systems for gas turbine engines that effectively provide thrust in subsonic, transonic and supersonic flight regimes, with reduced noise output during certain operations, remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine system. Another embodiment is a unique exhaust nozzle system for a gas turbine engine. Other embodiments include apparatuses, systems, devices, hardware, methods, and combinations for gas turbine engine systems and exhaust nozzle systems for gas turbine engines. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
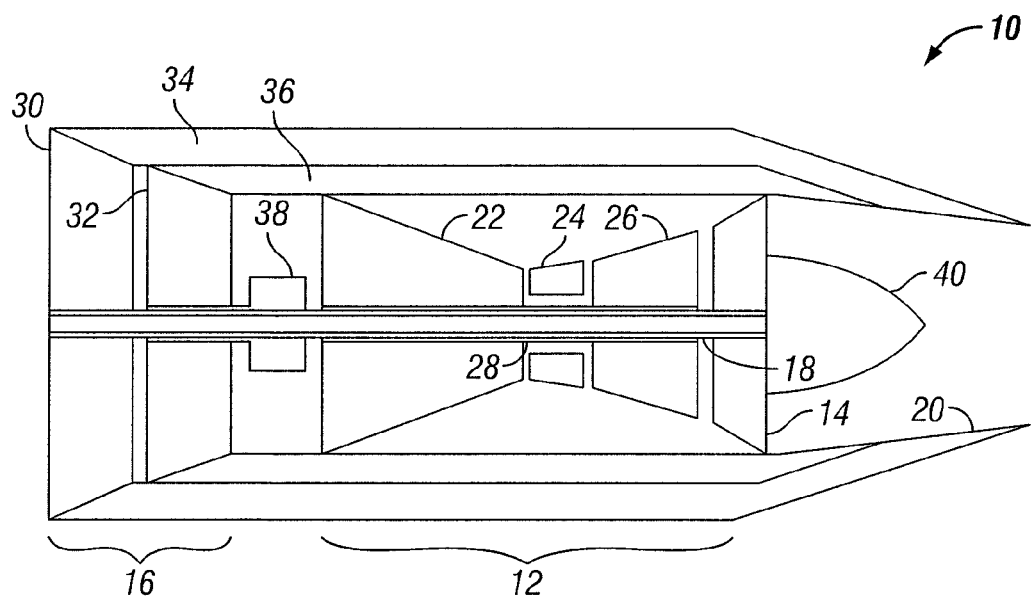
FIG. 1 schematically depicts some aspects of a non-limiting example of a variable cycle aircraft gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, some aspects of a non-limiting example of a gas turbine engine system 10 in accordance with an embodiment of the present invention are schematically depicted. In one form, gas turbine engine 10 is a variable cycle engine. In other embodiments, gas turbine engine 10 may not be a variable cycle engine. In one form, gas turbine engine 10 is an aircraft engine, and in particular, a turbofan engine. However, it will be understood that in other embodiments, engine 10 may be any other type of gas turbine engine. In still other embodiments, engine 10 may be a combined cycle engine.

Engine 10 includes a gas generator 12, a low pressure (LP) turbine 14, an adaptive fan 16, an LP shaft 18 and an exhaust nozzle system 20, such as a variable exhaust system having one or more variable nozzles. In one form, adaptive fan 16 is powered by LP turbine 14 via LP shaft 18. In other embodiments, adaptive fan 16 may be powered by other turbines in addition to or in place of LP turbine 14. Adaptive fan 16 is a turbofan system and drive system configured to operate one or more turbofan stages at at least two different speeds relative to the turbine(s) and/or shaft(s) that supply power to the drive system and turbofan system. In some embodiments, a conventional turbofan may be employed in addition to or in place of adaptive fan 16.

Gas generator 12 includes a compressor 22, a combustor 24, a high pressure (HP) turbine 26 and an HP shaft 28. Compressor 22 includes a plurality of compressor stages (not shown), and is coupled to HP turbine 26 via HP shaft 28 in a driving arrangement. Compressor 22 is configured to pressurize the airflow received at its inlet from adaptive fan 16. Some of the compressor discharge air and/or interstage air pressurized by compressor 22 may be supplied to other engine 10 components, e.g., turbine wheels, blades and vanes, for cooling. In addition, some of the compressor discharge air and/or interstage air pressurized by compressor 22 may be provided in the form of customer bleed air, e.g., for use by the aircraft environmental control systems, as well as for use in active lift surfaces and control surfaces of the aircraft, e.g., to maintain desirable airflow characteristics of such surfaces under varying flight conditions.

Combustor 24 is in fluid communication with compressor 22, and is structured to combust a mixture of fuel and compressor discharge air received from compressor 22. HP turbine 26 is in fluid communication with combustor 24, and is operative to receive the hot gases discharged by combustor 24, and to extract power therefrom for driving compressor 22. Engine core flowpath gases exiting HP turbine 26 are directed into LP turbine 14, which extracts mechanical power from the hot working airflow to drive adaptive fan 16. LP shaft 18 is coupled to LP turbine 14, and is configured to receive and transmit the mechanical power from LP turbine 14 to adaptive fan 16.

Adaptive fan 16 includes a base fan 30 and a variable-speed fan 32, both of which are powered by LP turbine 14 via LP shaft 18. It will be noted that in other embodiments of the present invention, depending on the configuration and/or installation of engine 10, another base rotating load in addition to or in place of base fan stage 30 may be employed, and another variable-speed rotating load in addition to or in place of variable-speed fan stage 32 may be employed. Examples of other base rotating loads include, but are not limited to, generators, pumps, gearboxes and compressors, the latter including one or more engine 10 core and/or intermediate compressors and/or engine 10 driven equipment. Examples of other variable-speed rotating loads include, but are not limited to, generators, pumps, gearboxes, one or more boost compressors, and/or may be one or more stages of a core and/or intermediate compressor, e.g., powered by HP shaft 28 and/or another turbine via a transmission system, such as that described herein, which is configured to vary the speed of the variable-speed rotating load.

In one form, base fan 30 includes a single rotating fan stage. In other embodiments, base fan 30 may include more than one fan stage. In one form, variable-speed fan 32 includes one rotating fan stage. In other embodiments, variable-speed fan 32 may include more than one rotating fan stage.

It will be understood that the term, "variable-speed," as applied to variable-speed fan 32, does not imply that the base rotating load, which in the present embodiment base fan 30, is limited to rotation at a single speed. Rather, the term, "variable-speed" is meant to indicate that the variable-speed load, which in the present embodiment is variable-speed fan 32, has a speed that is variable, in particular, variable relative to the speed of the base rotating load, e.g., base fan 30.

A portion of the airflow exiting base fan 30 is directed into a bypass duct 34 for directly providing thrust via exhaust nozzle system 20, and the balance is directed to variable-speed fan 32. A portion of the airflow exiting variable-speed fan 32 is directed into a bypass duct 36 for directly providing thrust via exhaust nozzle system 20, and the balance is directed into compressor 22 as core airflow, which provides thrust via exhaust nozzle system 20 after exiting LP turbine 14.

In one form, adaptive fan 16 is powered by LP turbine 14 via LP shaft 18, as previously mentioned. In one form, base fan 30 is coupled directly to LP shaft 18 and driven thereby, whereas variable-speed fan 32 is coupled to LP shaft 18 via an intervening transmission system 38, and hence is powered indirectly by LP shaft 18 via transmission system 38. In the present embodiment, transmission system 38 is configured to selectively vary the speed of variable-speed fan 32, e.g., relative to the speed of base fan 30. In other embodiments, fan 32 may not be powered by a transmission, e.g., transmission system 38, but rather, may be powered directly by LP shaft 18 or HP shaft 28. In still other embodiments, fan 16 may be a conventional fan having one or more stages operating at the same speed.

The gas flow discharged by LP turbine 14 is an engine core flow, and is referred to herein as a first stream flow. The first stream flow is discharged from LP turbine 14 around an engine tailcone 40. The air flow discharged by fan 32 into bypass duct 36 is a bypass flow, and is referred to herein as a second stream flow. The air flow discharged by fan 30 into bypass duct 34 is also a bypass flow, and is referred to herein as a third stream flow. That is, in the embodiment depicted in FIG. 1, engine 10 discharges into exhaust nozzle system 20 three distinct flow streams: the first stream flow, second stream flow and third stream flow mentioned above. In other embodiments, engine 10 may only discharge two flow streams into exhaust nozzle system 20, e.g., a core flow and a single bypass flow, or may discharge into exhaust nozzle system 20 any number of flow streams.

Under some operating conditions, for example, low aircraft speed subsonic operating conditions, such as take-off, approach, cut-back, landing and/or other low speed near-ground or on-ground operations, it is desirable to reduce the noise generated by engine 10. One way of reducing noise during such operations is to reduce the velocity or the exhaust stream discharged by exhaust nozzle system 20. In one form, exhaust nozzle system 20 includes an ejector to entrain ambient free stream air (i.e., air from outside of engine 10, e.g., air inside or outside of the nacelle, housing or other structure into which engine 10 is installed) into the first stream flow, second stream flow and/or third stream flow in order to reduce the velocity of the exhaust stream discharged by exhaust nozzle system 20.

Figure 2:
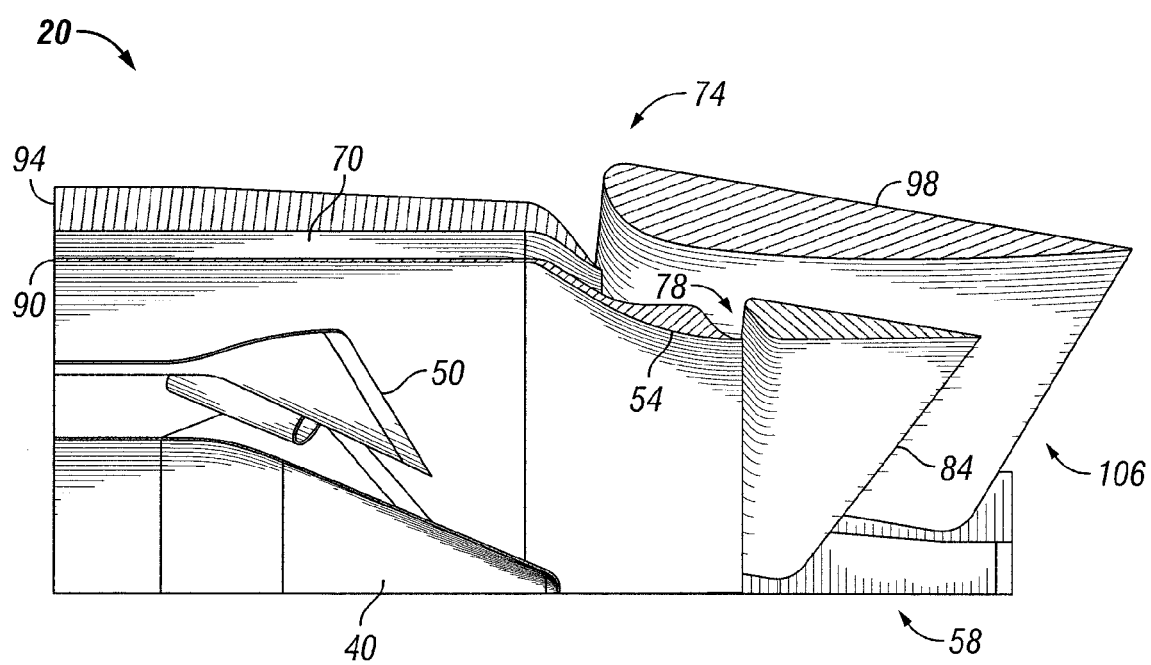
FIG. 2 is a sectional view illustrating some aspects of a non-limiting example of a supersonic converging-diverging nozzle in accordance with an embodiment of the present invention.
Figure 3:
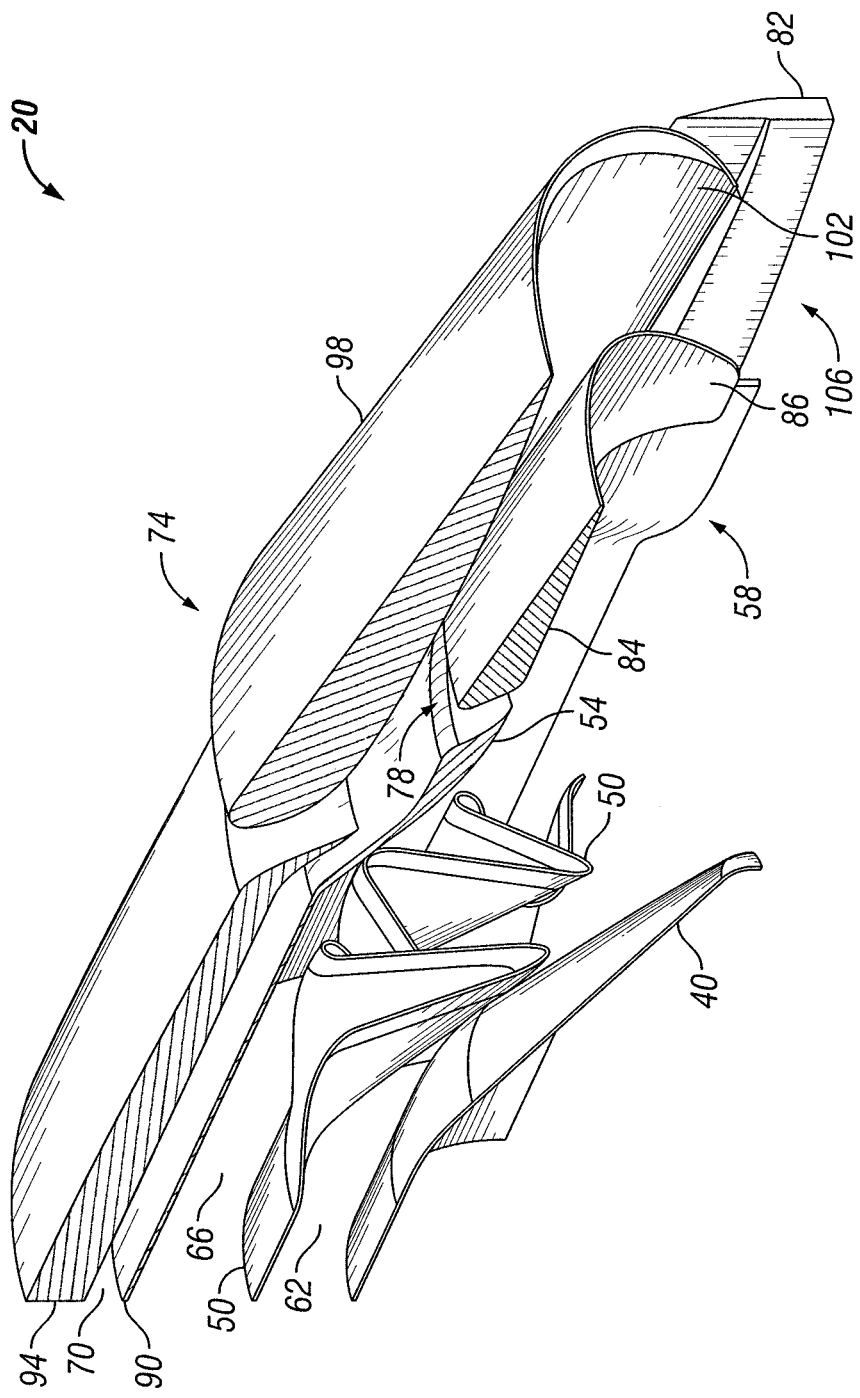
FIG. 3 is a partial isometric sectional view illustrating some aspects of a non-limiting example of a supersonic converging-diverging nozzle in accordance with an embodiment of the present invention.

Referring now to FIGS. 2 and 3, some aspects of a non-limiting example of exhaust nozzle system 20 in accordance with an embodiment of the present invention are illustrated. The illustrations of FIGS. 2 and 3 are sectional in nature, and only illustrate a portion of many of the components identified herein, e.g., approximately 90 degrees of rotation for circular or elliptical components. It will be understood by those of ordinary skill in the art that an actual an nozzle system 20 would extend to 360 degrees of rotation.

In one form, exhaust nozzle system 20 is a supersonic converging-diverging nozzle. In other embodiments, exhaust nozzle system 20 may not be a supersonic converging-diverging nozzle. Exhaust nozzle system 20 includes a mixer 50, a nozzle 54, a nozzle 58, an inner flowpath 62, a middle flowpath 66, an outer flowpath 70, an ejector 74 and an ejector 78. In one form, exhaust nozzle system 20 is configured to discharge the third stream flow with entrained ambient free stream air, and mixed first stream flow and second stream flow. In other embodiments, exhaust nozzle system 20 may be configure to discharge only two flow streams with or without entrained ambient free steam air, or any other number of flow streams with or without entrained ambient free steam air.

Mixer 50 is configured to mix the first stream flow and the second stream flow. Mixer 50 is positioned upstream of nozzle 54. In other embodiments, mixer 50 may be configured to mix other flow streams. In one form, mixer 50 is a forced mixer. In other embodiments, mixer 50 may not be a forced mixer. For example and without limitation, in various embodiments, mixer 50 may be a chevron mixer or a simple splitter that allows the first stream flow and the second stream flow to mix, e.g., confluent flow mixing. In one form, mixer 50 is a lobed mixer. In other embodiments, mixer 50 may take other forms. In one form, mixer 50 is fixed. In other embodiments, mixer 50 may be a variable mixer, e.g., moveable between different positions and configured to vary the mixing length and/or the bypass ratio as between the second stream flow and the first stream flow and/or between other flow streams. Still other embodiments may not employ a mixer.

In one form, nozzle 54 is positioned downstream of mixer 50. In other embodiments, nozzle 54 may be positioned upstream of mixer 50. In one form, nozzle 54 is a converging nozzle configured to accelerate and discharge the mixed first stream flow and second stream flow. The length of nozzle 54 may vary with the needs of the application, e.g., to achieve a desired exhaust plume shape. In one form, nozzle 54 has a circular throat. In other embodiments, the throat of nozzle 54 may be another shape, e.g., elliptical, rectangular or any other suitable shape.

Nozzle 58 is disposed downstream of nozzle 54. Nozzle 58 is configured to receive, accelerate and discharge the mixed first stream flow and second stream flow. In one form, nozzle 58 is a variable nozzle. In other embodiments, nozzle 58 may be a fixed nozzle. In one form, nozzle 58 is configured as a diverging nozzle. In other embodiments, nozzle 58 may be configured as a converging nozzle, or as a nozzle operative to selectively function as a converging nozzle and a diverging nozzle. In some embodiments, nozzle 58 may be a converging diverging nozzle. In a particular form, nozzle 58 is configured as a variable diverging nozzle having a variable divergence angle. In one form, nozzle 58 is formed of a two flaps 84 positioned opposite each other. In other embodiments, any number of flaps or other structures may be employed. In still other embodiments, nozzle 58 may take other forms. In one form, flaps 84 are pivotably attached to a side wall 82, e.g., of an engine nacelle, and are each configured to pivot about a pivot point 86 in order to vary the divergence angle of nozzle 58. In one form, flaps 84 are arcuate. In other embodiments, flaps 84 may be linear, e.g., flat. In various embodiments, flaps 84 may take any suitable shape. In one form, flaps 84 are configured to rotate to approximately 0° divergence angle for use during low speed operations, and to approximately 10° divergence angle for high sonic, transonic and supersonic flight operations. In other embodiments, other angles may be employed. In still other embodiments, flaps 84 may be configured for other forms of motion, e.g., translation, alone or in combination with rotation, in order to vary the divergence angle.

Inner flowpath 62 is in fluid communication with the discharge of LP turbine 14, and is operative to receive and conduct the pressurized gases discharged by LP turbine 14 (first stream flow). Inner flowpath 62 is formed between tailcone 40 and mixer 50. Middle flowpath 66 is in fluid communication with bypass duct 36, and is operative to receive and conduct pressurized air discharged by fan 32 (second stream flow). Middle flowpath 66 is formed between mixer 50 and a wall 90 extending from nozzle 54. Outer flowpath 70 is in fluid communication with bypass duct 34, and is operative to receive and conduct pressurized air discharged by fan 30 (third stream flow). Outer flowpath 70 is formed between wall 90 and a nozzle exterior wall 94.

Ejector 74 is configured to entrain ambient free stream air into the third flow stream received via outer flowpath 70 to form a mixed flow including both the ambient free stream air and the third stream flow. In some embodiments, ejector 74 is also configured to form a thrust reverser. In other embodiments, ejector 74 may not form a thrust reverser. In one form, ejector 74 includes two ejector doors 98. In other embodiments, ejector 74 may take other forms and/or may include any number of ejector doors. In one form, ejector doors 98 are arcuate. In other embodiments, ejector doors may be linear, e.g., flat. In various embodiments, ejector doors 98 may take any suitable shape. In one form, ejector doors 98 are variable-position doors, e.g., doors that are configured to be moved by one or more actuation systems (not shown) into more than one position. In one form, ejector doors 98 are configured to vary the amount of ambient free stream air entrained into the other flow stream, e.g., by changing positions.

In one form, each ejector door 98 is pivotably attached to side wall 82 (and/or one or more other structures in other embodiments), and is configured to pivot about a pivot point 102 in order to vary its position. In other embodiments, ejector doors 98 may be configured for other forms of motion, e.g., translation, alone or in combination with rotation. Ejector doors 98 are configured to selectively form and vary a gap between nozzle exterior wall 94 (and/or other structures in other embodiments) and ejector doors 98. By varying the position of ejector doors 98, ejector doors 98 are configured to selectively vary the gap between nozzle exterior wall 94 (and/or other structures in other embodiments) and ejector doors 98, and hence vary the amount of ambient air entrained into the third flow stream (or one or more other flow streams in other embodiments). The size of the gap at a particular angle of ejector doors 98 may vary with the needs of the application. In one example, approximately 10° or less of rotation of ejector doors 98 has been found suitable for entraining a sufficient amount of ambient air at take-off conditions and other near-ground operations to meet desired noise reduction goals. The amount of rotation may vary with the needs of the application. In some embodiments, ejector doors 98 may be selectively rotated a larger amount, e.g., 30-60 degrees, in order to form a thrust reverser. In other embodiments, ejector doors 98 may be rotated or otherwise moved to greater or lesser degrees in order to form a thrust reverser.

In one form, ejector doors 98 are also configured to selectively prevent the entrainment of the ambient free stream air. In other embodiments, ejector doors 98 may not be configured to selectively prevent the entrainment of the ambient free stream air. In one form, ejector doors 98 are configured to selectively prevent the entrainment of the ambient free stream air by moving into a position that closes the gap between nozzle exterior wall 94 (and/or other structures in other embodiments) and ejector doors 98. In other embodiments, ejector doors 98 may be configured to selectively prevent the entrainment of the ambient free stream air via other means.

In addition, in some embodiments, ejector doors 98 are configured to form a nozzle 106 in addition to forming an ejector. For example, in the depiction of FIG. 2, a counter-clockwise rotation of the depicted ejector door 98 would eventually result in closing the gap between ejector door 98 and wall 94; in some embodiments, ejector doors 98 are configured to form a diverging nozzle when in the closed position. Rotation in the clockwise direction of the depicted ejector door 98 would result in a reduction in the divergence angle, and continued rotation in the clockwise direction would yield ejector door 98 to be at a converging angle, hence forming, in conjunction with the other ejector door 98, a converging nozzle. Thus, at low speed operation, wherein it is desirable to entrain ambient free stream air in order to reduce noise, ejector doors 98 also form a converging nozzle in some embodiments. At high speed operation, ejector doors 98 would be rotated in the opposite direction to form a diverging nozzle, and reducing or eliminating the entrainment of ambient free stream air. Hence, in some embodiments, ejector doors 98 are configured to selectively form nozzle 106 as a converging or a diverging nozzle. In one form, nozzle 106 is formed in part by the shape of the exterior surfaces of nozzle 58, in conjunction with the interior surfaces of ejector doors 98. In other embodiments, nozzle 106 may be formed by ejector doors 98 alone.

In one form, ejector 78 is disposed inward of ejector 74, and is configured to entrain air from the mixed flow in outer flowpath 70 into the flow stream discharged by the nozzle 54. In other embodiments, ejector 78 may be configured to entrain air from the third stream flow in flowpath 70, e.g., upstream of ejector 74, or to entrain air from one or more other sources. In one form, ejector 78 is formed by nozzle 58, by changing its position (the positions of flaps 84) to form a gap between nozzle 58 and nozzle 54, e.g., the aft surface of nozzle 54. In other embodiments, ejector 78 may be formed by other structures. In one form, ejector 78 is a variable ejector configured to vary the amount of air entrained into the flow stream discharged by nozzle 54, e.g., by varying the position of flaps 84 to vary the gap between flaps 84 and nozzle 54. In other embodiments, ejector 78 may not be a variable ejector. In one form, ejector 78 is configured to selectively close and prevent entrainment of air from the mixed flow or third stream flow, e.g., by changing the position of flaps 84 to engage the aft surface of nozzle 54, thereby closing the gap between nozzle 58 and nozzle 54.

Embodiments of the present invention include a gas turbine engine system, comprising: a fan system; a compressor system in fluid communication with the fan system; a combustion system in fluid communication with the compressor system; a turbine system in fluid communication with the combustion system, wherein the turbine system is configured to discharge a first stream flow in the form of an engine core flow; and wherein the fan system is configured to discharge a second stream flow in the form of a bypass flow and to discharge a third stream flow in the form of an other bypass flow; and a exhaust nozzle system in fluid communication with the fan system and the turbine system, including: a first nozzle configured to discharge the first stream flow and the second stream flow; and an ejector configured to entrain ambient free stream air into the third stream flow.

In a refinement, the exhaust nozzle system is configured to discharge the third stream flow with entrained ambient free stream air, and the first stream flow and the second stream flow.

In another refinement, the exhaust nozzle system includes a mixer configured to mix the first stream flow and the second stream flow.

In yet another refinement, the ejector includes a plurality of ejector doors.

In still another refinement, the ejector doors are variable-position doors.

In yet still another refinement, the ejector doors are configured to vary an amount of ambient free stream air entrained into the third stream flow.

In a further refinement, the ejector doors are configured to close and prevent entrainment of ambient free stream air.

In a yet further refinement, the ejector doors are configured to selectively form a thrust reverser.

In a still further refinement, the ejector doors are configured to form a second nozzle.

In a yet still further refinement, the second nozzle is configured to selectively form a converging nozzle or a diverging nozzle.

In an additional refinement, the exhaust nozzle system is configured as a supersonic nozzle system.

In another additional refinement, the exhaust nozzle system includes a third nozzle configured to discharge the first stream flow and the second stream flow.

In yet another additional refinement, the third nozzle is configured as a variable nozzle.

In still another additional refinement, the variable nozzle is configured as a variable diverging nozzle having a variable divergence angle.

In yet still another additional refinement, the first nozzle is a converging nozzle.

Embodiments of the present invention include an exhaust nozzle system for a gas turbine engine, comprising:
a first nozzle configured to discharge a flow stream of the gas turbine engine, wherein the first nozzle is a converging nozzle; and
a first ejector in fluid communication with an other flow stream discharged by the gas turbine engine and configured to entrain ambient free stream air into the other flow stream to form a mixed flow, wherein the first ejector is also configured to form a thrust reverser.

In a refinement, the first ejector includes a plurality of variable-position ejector doors.

In another refinement, the ejector doors are configured to vary an amount of ambient free stream air entrained into the other flow stream.

In yet another refinement, the ejector doors are configured to close and prevent entrainment of ambient free stream air.

In still another refinement, the ejector doors are configured to selectively form a thrust reverser.

In yet still another refinement, the ejector doors are configured to form a second nozzle.

In a further refinement, the second nozzle is configured to selectively form a converging nozzle or a diverging nozzle.

In a yet further refinement, the wherein the flow stream is a combination of an engine core flow and a first bypass flow stream, and wherein the other flow stream is a second bypass flow stream different from the first bypass flow stream.

In a still further refinement, the exhaust nozzle system further comprises a third nozzle configured to discharge the flow stream.

In a yet still further refinement, the third nozzle is a diverging nozzle.

In an additional refinement, the third nozzle is configured as a variable nozzle.

In another additional refinement, the variable nozzle is configured as a variable divergent nozzle having a variable divergence angle.

In yet another additional refinement, the exhaust nozzle system further comprises a second ejector disposed inward of the first ejector, wherein the second ejector is configured to entrain air from the mixed flow or the other flow stream into the flow stream discharged by the first nozzle.

In still another additional refinement, the second ejector is formed by a third nozzle, wherein the third nozzle is disposed downstream of the first nozzle.

In yet still another additional refinement, the second ejector is configured as a variable ejector.

In the second ejector is also configured to close and prevent entrainment of the air from the mixed flow or the other flow stream.

In another refinement, the first nozzle is a converging nozzle.

In yet another refinement, the flow stream is a combination of an engine core flow and a first bypass flow stream, further comprising a mixer disposed upstream of the first nozzle and configured to mix the engine core flow and the first bypass flow stream.

Embodiments of the present invention include a gas turbine engine system, comprising: a fan system; a compressor system in fluid communication with the fan system; a combustion system in fluid communication with the compressor system; a turbine system in fluid communication with the combustion system, wherein the turbine system is configured to discharge a first stream flow in the form of an engine core flow; and wherein the fan system is configured to discharge a second stream flow in the form of a bypass flow and to discharge a third stream flow in the form of an other bypass flow; and an exhaust nozzle system in fluid communication with the fan system and the turbine system, including: means for discharging the first stream flow, the second stream flow and the third stream flow, including means for reversing thrust of the gas turbine engine system.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine system, comprising:
   a fan system;
   a compressor system in fluid communication with the fan system;
   a combustion system in fluid communication with the compressor system;
   a turbine system in fluid communication with the combustion system, wherein the turbine system is configured to discharge a first stream flow in the form of an engine core flow;
   and wherein the fan system is configured to discharge a second stream flow in the form of a bypass flow and to discharge a third stream flow in the form of another bypass flow; and
   an exhaust nozzle system in fluid communication with the fan system and the turbine system, including:
   a first nozzle configured to discharge the first stream flow and the second stream flow;
   an ejector configured to entrain ambient free stream air into the third stream flow, the ejector including a plurality of ejector doors extending from forward ends to aft ends located aft of the forward ends, the ejector doors pivotably mounted for rotation about points closer to the aft ends of the ejector doors than the forward ends of the ejector doors; and
   a lobed mixer configured to mix the first stream flow and the second stream flow.

2. The gas turbine engine system of claim 1, wherein the ejector doors are configured to vary an amount of the ambient free stream air entrained into the third stream flow.

3. The gas turbine engine system of claim 2, wherein the ejector doors are configured to selectively close and prevent entrainment of the ambient free stream air.

4. The gas turbine engine system of claim 1, wherein the ejector doors are configured to form a second nozzle that provides a converging nozzle or a diverging nozzle.

5. The gas turbine engine system of claim 1, wherein the exhaust nozzle system includes a second nozzle configured to discharge the first stream flow and the second stream flow.

6. The gas turbine engine system of claim 5, wherein the second nozzle is configured as a variable nozzle.

7. The gas turbine engine system of claim 6, wherein the variable nozzle is configured as a variable diverging nozzle having a variable divergence angle.

8. The gas turbine engine system of claim 1, wherein the first nozzle is a converging nozzle.

9. The gas turbine engine system of claim 1, further comprising a second ejector configured to entrain air into the flow stream discharged by the first nozzle, the second ejector including a plurality of ejector doors extending from forward ends to aft ends located aft of the forward ends, the ejector doors of the second ejector pivotably mounted for rotation about points closer to the aft ends of the ejector doors included in the second ejector than the forward ends of the ejector doors included in the second ejector.

10. An exhaust nozzle system for a gas turbine engine, comprising:
    a first nozzle configured to discharge a flow stream of the gas turbine engine, wherein the first nozzle is a converging nozzle;
    a first ejector in fluid communication with another flow stream discharged by the gas turbine engine and configured to entrain ambient free stream air into the another flow stream to form a mixed flow; and
    a second ejector disposed inward of the first ejector, wherein the second ejector is configured to entrain air from the mixed flow or the another flow stream into the flow stream discharged by the first nozzle, wherein the second ejector is formed by a plurality of variable-position flaps extending from forward ends to aft ends located aft of the forward ends, and wherein each of the plurality of variable-position flaps is pivotably mounted for rotation about points located closer to the aft end of the variable-position flap than the forward end of the variable position flap.

11. The exhaust nozzle system of claim 10, wherein the first ejector includes a plurality of variable-position ejector doors.

12. The exhaust nozzle system of claim 11, wherein the ejector doors are configured to vary an amount of the ambient free stream air entrained into the another flow stream.

13. The exhaust nozzle system of claim 12, wherein the ejector doors are configured to selectively close and prevent entrainment of the ambient free stream air.

14. The exhaust nozzle system of claim 11, wherein the ejector doors are configured to form a second nozzle that provides a converging nozzle or a diverging nozzle.

15. The exhaust nozzle system of claim 10, wherein the second ejector is formed by a second nozzle, wherein the second nozzle is disposed downstream of the first nozzle.

16. The exhaust nozzle system of claim 10, wherein the first ejector is configured to entrain ambient free stream air into the third stream flow, the first ejector including a plurality of ejector doors extending from forward ends to aft ends located aft of the forward ends, the ejector doors of the first ejector pivotably mounted for rotation about points closer to the aft ends of the ejector doors included in the first ejector than the forward ends of the ejector doors included in the first ejector.

17. An exhaust nozzle system for a gas turbine engine, comprising:
- a first nozzle configured to discharge a flow stream of the gas turbine engine, wherein the first nozzle is a fixed-position nozzle that converges toward a central axis at an aft end of the first nozzle and the flow stream is a combination of an engine core flow and a first bypass flow stream;
- a first ejector in fluid communication with another flow stream discharged by the gas turbine engine and configured to entrain ambient free stream air into the another flow stream to form a mixed flow; and
- a mixer disposed upstream of the first nozzle and configured to mix the engine core flow and the first bypass flow stream.

* * * * *